R. L. FRINK.
GLASS CONVEYING AND STACKING MACHINE.
APPLICATION FILED JUNE 22, 1908.
916,945.
Patented Mar. 30, 1909.
2 SHEETS—SHEET 1.
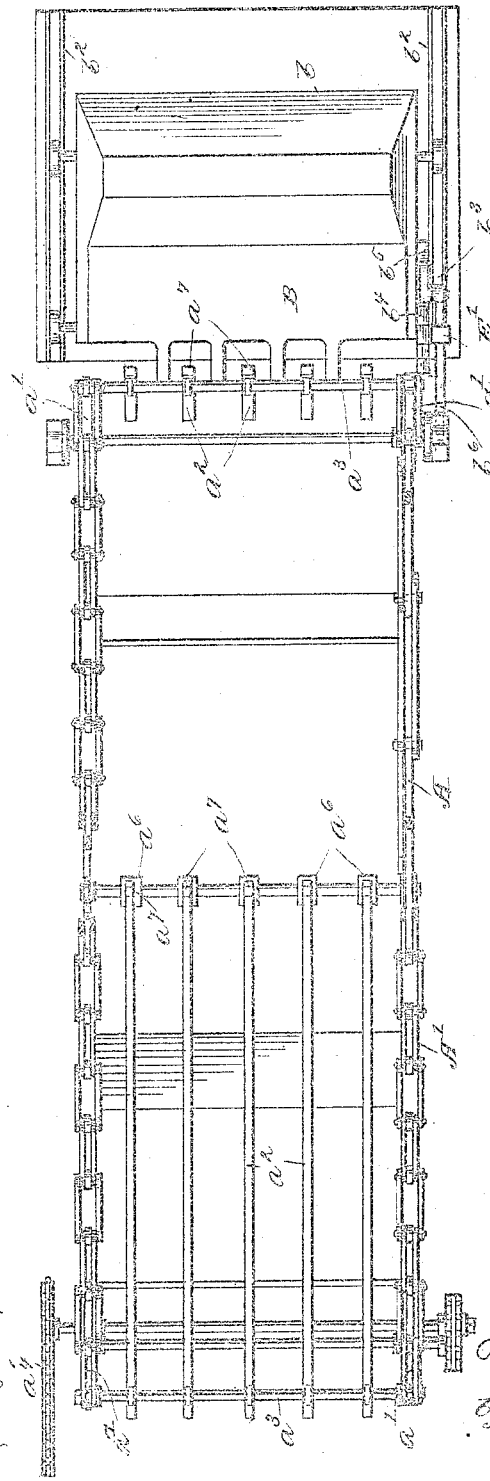
Witnesses
J. C. Turner
Jno. F. Oberlin
Inventor:
Robert L. Frink
by J. B. Fay
Attorney

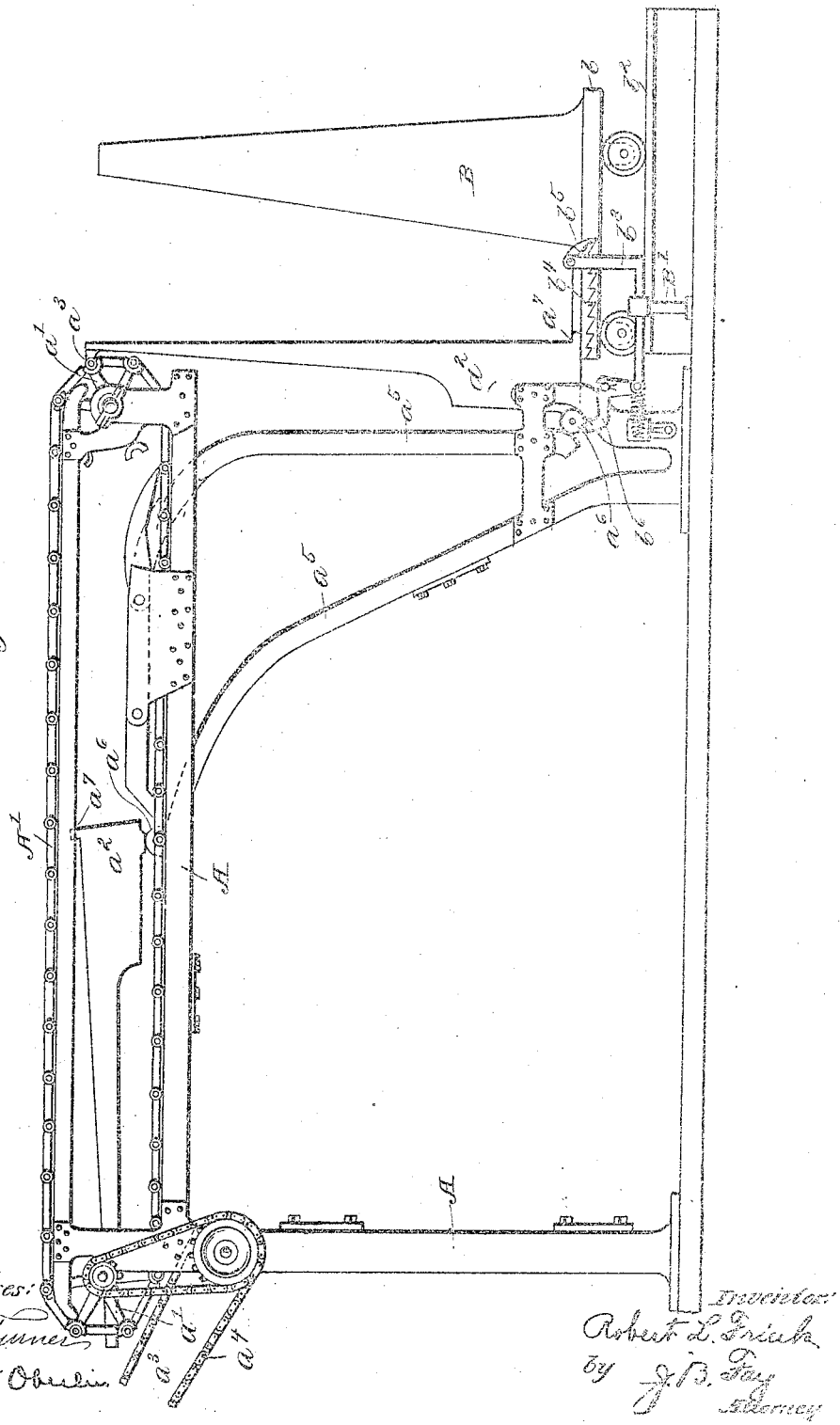

UNITED STATES PATENT OFFICE.

ROBERT L. FRINK, OF CLEVELAND, OHIO.

GLASS CONVEYING AND STACKING MACHINE.

No. 916,945.  Specification of Letters Patent.  Patented March 30, 1909.

Original application filed April 5, 1907, Serial No. 366,477. Divided and this application filed June 22, 1908. Serial No. 439,766.

*To all whom it may concern:*

Be it known that I, ROBERT L. FRINK, citizen of the United States, resident of Cleveland, county of Cuyahoga, and State of Ohio, have invented a new and useful Improvement in Glass Conveying and Stacking Machines, of which the following is a specification, the principle of the invention being herein explained and the best mode in which I have contemplated applying that principle, so as to distinguish it from other inventions.

The present invention, while relating to the manufacture of window glass pertains more particularly to mechanism for conveying and stacking, or piling, the flattened sheets as they are received from the annealing oven. Such mechanism forms a part of a complete machine for making window glass, described in its entirety in my co-pending application filed April 5, 1907, Serial No. 366,477, from which the present application has been divided out.

The object of the invention is the provision of a machine of this character that will be simple and efficient in its operation and at the same time reduce to a minimum the loss from breakage ordinarily incurred in handling window glass at this stage in its manufacture.

To the accomplishment of these and related ends, said invention, then, consists of the means hereinafter fully described and particularly pointed out in the claims.

The annexed drawings and the following description set forth in detail certain means embodying the invention, such disclosed means constituting, however, but one of various mechanical forms in which the principle of the invention may be used.

In said annexed drawings:—Figure 1 is a plan view of a piling or stacking device embodying my several improvements; and Fig. 2 is a side elevation of such device.

As has been indicated, the mechanism in hand is designed to be located contiguously to the discharge end of the cooling chamber, or annealing leer. The glass is conveyed both through the latter and the flattening chamber, which is located in advance thereof, on an endless conveyer, or moving table, and it is from the latter then that the present machine is adapted directly to receive successive sheets of the glass and thence to convey them to the desired point of discharge and stack or pile the same on edge. Such device comprises essentially a frame A whereby is supported in a substantially horizontal plane and on a level with the moving table in the annealing leer, a conveyer $A'$. The latter consists of a pair of cable or sprocket chains $a$ passing over corresponding pairs of sprocket wheels $a'$ mounted in said frame at each end. The shaft upon which such sprocket wheels $a'$ are mounted adjacent to the termination of the aforesaid table is connected with the shaft of the sprocket wheels (not shown) of the latter by a chain $a^4$ so as to be driven in unison therewith, or directly by any other suitable driving means as desired. The sheet is designed to be received by said piling device upon carrier members $a^4$ to the construction of which particular attention is directed. Each of such carrier members, two being shown in the device illustrated, consists of a series of similar bars pivotally attached at one end to a transverse shaft $a^3$ connecting the two cables or chains $a$. The other ends of said bars are free to move independently of said cable, a cam track $a^5$ being provided to guide such ends, which latter are provided with rollers $a^6$ adapted to travel on said track. The formation of the track, as will be obvious from an inspection of Fig. 2, is such as to position said carrier members alternately horizontally to receive the sheet from the continuously moving table of the annealing leer, and vertically to deposit such sheet on edge at the farther end of the piling device. That the sheet may be safely held pending its being lowered to the vertical position by the carrier, the bars constituting the latter are formed with off-sets or projections $a^7$ to securely retain the lower edge of the sheet. To receive the successive sheets as they are thus lowered on edge, a car B is provided consisting simply of a truck $b$ provided with an upright support $b'$ against which the sheets are designed to lean. This car is supported on a track $b^2$ at a height such that, as the sheets are lowered, their bottom edges are engaged by the floor of the car and remain resting thereon being gently tilted over against the support as the carrier member of the piling device is withdrawn, upon the continued forward movement of the actuating cable. To automatically advance the car as successive sheets are placed thereon, thus making room for the next sheet, a pawl and ratchet device B' is provided, being mounted on the adjacent portion of frame A. A simple form of this device is that illustrated, Fig. 2, where $b^3$ is a longitudinally reciprocable bar bearing at its outer end a pawl $b^5$ adapted to engage a rack $b^4$ attached to truck B. A crank-arm $b^6$, having a slotted connection with the other end of bar $b^3$, serves to thus reciprocate the latter, actuation of the arm being had by successive passages of a roller $a^6$ of one of the bars constituting a carrier member $a^2$, as such roller reaches the lowermost portion of trackway $a^5$.

The operation of my improved machine should be fully evident from the preceding description of its construction, and hence need be but briefly reviewed by way of conclusion. The sheet as it reaches the end of the furnace conveyer, or moving table, is run off on to one of the carrier members of the stacking device, movement of the latter being so timed as to present such carrier member in position simultaneously with the arrival of the sheet at the discharge end of the furnace conveyer. By such carrier member, then, the sheet is not only conveyed the length of the machine, which may be varied to suit circumstances, but is finally deposited on the car B in a vertical position practically without jar or other abrupt movement such as would have the slightest tendency to break the sheet. When a sufficient number of sheets have been thus collected on the car the latter serves in turn to transport such sheets to the cutting department where they are given their final form.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In mechanism of the class described, a sheet piling device comprising a member movable in a substantially horizontal plane; a carrier member pivotally attached to said first member and adapted to receive and bear the sheet to be piled; and means for oscillating said carrier member about its point of attachment to said first member upon movement of the latter.

2. In mechanism of the class described, a sheet piling device comprising a member movable in a substantially horizontal plane; a carrier member pivotally attached at one end to said first member and adapted to receive and bear the sheet to be piled; and means independent of said first member for controlling the movement of the other end of said carrier member.

3. In mechanism of the class described, a sheet piling device comprising a member movable in a substantially horizontal plane; a carrier member pivotally attached at one end to said first member and adapted to receive and bear the sheet to be piled, and a cam track engaging the other end of said carrier member and adapted to oscillate the same about its point of attachment to said first member.

4. In mechanism of the class described, a sheet piling device comprising a member movable in a substantially horizontal plane; a carrier member attached to and actuated by said first member, and means adapted to position said carrier member alternately horizontally to receive the sheet to be piled and vertically to deposit the same on edge.

5. In mechanism of the class described, a sheet piling device comprising a member movable in a substantially horizontal plane; a carrier member pivotally attached at one end to said first member; and a cam track engaging the other end of said carrier member and adapted to oscillate the same about its point of attachment to said first member to position the same alternately horizontally to receive the sheet to be piled and vertically to deposit such sheet on edge.

6. In mechanism of the class described, a sheet piling device comprising an endless cable, a carrier member pivotally attached to said cable and adapted to receive and bear the sheet to be piled, and means for oscillating said carrier member about its point of attachment to said cable.

7. In mechanism of the class described, a sheet piling device comprising an endless cable, a carrier member pivotally attached at one end to said cable and adapted to receive and bear the sheet to be piled, and means independent of said cable for controlling the movement of the other end of said carrier member.

8. In mechanism of the class described, a sheet piling device comprising an endless cable, a carrier member pivotally attached at one end to said cable and adapted to receive and bear the sheet to be piled, and a cam track engaging the other end of said carrier member and adapted to oscillate the same about its point of attachment to said cable.

9. In mechanism of the class described, a sheet piling device comprising a substantially horizontally disposed endless cable, a carrier member attached to and actuated by said cable, and means adapted to position said member alternately horizontally to receive the sheet to be piled and vertically to deposit the same on edge.

10. In mechanism of the class described, a sheet piling device comprising a substantially horizontally disposed endless cable, a carrier member pivotally attached at one end to said cable, and a cam track engaging the other end of said carrier member and adapted to oscillate the same about its point of attachment to said cable to position the same alternately horizontally to receive the sheet to be piled and vertically to deposit such sheet on edge.

11. In mechanism of the class described, a sheet piling device comprising a substantially horizontally disposed endless cable, a carrier member attached to and actuated by said cable, means adapted to position said member alternately horizontally to receive the sheet to be piled and vertically to deposit the same on edge; and a car disposed adjacent to said device and adapted to receive the sheets thus deposited.

12. In mechanism of the class described, a sheet piling device comprising a member movable in a substantially horizontal plane; a carrier member pivotally attached at one end to said cable; a cam track engaging the other end of said carrier member and adapted to oscillate the same about its point of attachment to said cable to position the same alternately horizontally to receive the sheet to be piled and vertically to deposit such sheet on edge; a car disposed adjacent to said device and adapted to receive the sheets thus deposited; and means for automatically advancing said car as successive sheets are deposited.

13. In mechanism of the class described, a sheet piling device comprising a member movable in a substantially horizontal plane; a carrier member pivotally attached at one end to said cable, a cam track engaging the other end of said carrier member and adapted to oscillate the same about its point of attachment to said cable to position the same alternately horizontally to receive the sheet to be piled and vertically to deposit such sheet on edge; a car disposed adjacent to said device and adapted to receive the sheets thus deposited; and pawl and ratchet mechanism adapted to be actuated by said carrier member to automatically advance said car as successive sheets are deposited.

14. In mechanism of the class described, a sheet piling device comprising a suitable frame; a pair of sprocket wheels mounted in each end of said frame; endless sprocket chains passing over said wheels; a transverse rod connecting said chains; a plurality of carrier bars pivotally attached at one end to said rod and provided with rollers at the other end, said bars being adapted to receive and bear the sheet to be piled; and cam tracks mounted in said frame to engage said rollers, respectively, said cam tracks being disposed to position said bars alternately horizontally to receive the sheet to be piled and vertically to deposit the same on edge.

15. In mechanism of the class described, a sheet piling device comprising a suitable frame; a pair of sprocket wheels mounted in each end of said frame; endless sprocket chains passing over said wheels; a transverse rod connecting said chains; a plurality of carrier bars pivotally attached at one end to said rod and provided with rollers at the other end, said bars being adapted to receive and bear the sheet to be piled; cam tracks mounted in said frame to engage said rollers, respectively, said cam tracks being disposed to position said bars alternately horizontally to receive the sheet to be piled and vertically to deposit the same on edge; a car disposed adjacent to said device and adapted to receive the sheets thus deposited; and pawl and ratchet mechanism for advancing said car, said mechanism being actuated by the roller of one of said carrier members as successive sheets are deposited.

Signed by me this 16th day of June, 1908.

ROBERT L. FRINK.

Attested by—
  E. R. RODD,
  JNO. F. OBERLIN.